(12) United States Patent
Karakas (10) Patent No.: US 10,924,568 B1
(45) Date of Patent: Feb. 16, 2021

(54) MACHINE LEARNING SYSTEM FOR NETWORKING

(71) Applicant: introduce.social Inc., Palo Alto, CA (US)

(72) Inventor: Ahmet Karakas, Palo Alto, CA (US)

(73) Assignee: shallow.AI Inc., Los Altos, CA (US)

( * ) Notice: Subject to any disclaimer, the term of this patent is extended or adjusted under 35 U.S.C. 154(b) by 0 days.

(21) Appl. No.: 16/597,806

(22) Filed: Oct. 9, 2019

Related U.S. Application Data (60) Provisional application No. 62/744,042, filed on Oct. 10, 2018.

(51) Int. Cl.
*H04L 29/08* (2006.01)
*H04L 12/58* (2006.01)
*G06Q 50/00* (2012.01)

(52) U.S. Cl.
CPC .............. *H04L 67/22* (2013.01); *H04L 51/32* (2013.01); *H04L 67/322* (2013.01); *G06Q 50/01* (2013.01)

(58) Field of Classification Search
CPC ......... H04L 29/08936; H04L 29/08675; H04L 51/32; H04L 67/22; H04L 41/14–147; H04L 67/32; G06Q 30/0631; G06Q 50/01; H04N 21/25–251; H04N 21/45; H04N 21/466–4668
See application file for complete search history.

(56) References Cited

U.S. PATENT DOCUMENTS

| | | | | |
|---|---|---|---|---|
| 2011/0218946 | A1* | 9/2011 | Stern | G06N 20/00 706/12 |
| 2014/0074879 | A1* | 3/2014 | Kwon | G06F 16/245 707/769 |
| 2015/0172145 | A1* | 6/2015 | Skiba | H04W 4/21 709/224 |
| 2016/0314113 | A1* | 10/2016 | Moharrami | H04L 51/32 |
| 2017/0351769 | A1* | 12/2017 | Karakas | G06F 16/958 |
| 2018/0189668 | A1* | 7/2018 | Ray | G06N 20/00 |

* cited by examiner

*Primary Examiner* — Brendan Y Higa
(74) *Attorney, Agent, or Firm* — Aka Chan LLP (57) ABSTRACT

A system and method provides a platform to connect individuals for networking among professionals based on interest.

20 Claims, 2 Drawing Sheets

MACHINE LEARNING SYSTEM FOR NETWORKING

CROSS-REFERENCE TO RELATED APPLICATIONS

This patent application claims the benefit of U.S. patent application 62/744,042, filed Oct. 10, 2018, which is incorporated by reference along with all other references cited in this application.

BACKGROUND OF THE INVENTION

This invention relates to computers and software and more specifically, social networking and business and professional networking.

Social networks track and enable online connections between users. Typical social networking systems allow users to associate themselves with other users to create a network of connections among the users of the social networking system.

There is a need for improved computers and software, especially a system and method for a platform to connect individuals for networking among professionals based on interest.

BRIEF SUMMARY OF THE INVENTION

A system and method provides a platform to connect individuals for networking among professionals based on interest.

U.S. patent application Ser. Nos. 15/612,546, 15/612,587, 15/612,603, 15/612,633, and 15/612,655, filed Jun. 2, 2017, Ser. No. 15/937,804, filed Mar. 27, 2018, Ser. No. 16/102,672, filed Aug. 13, 2018, and Ser. Nos. 16/380,765 and 16/380,883, filed Apr. 10, 2019, which are incorporated by reference.

In an implementation, a method includes: providing a social networking service comprising a content spreading engine; for the content spreading engine, using an electronic processor, calculating a spreadability (Si) component of a given content using an equation $Si=f(w\ sT)$, where $f(x)=1/(1+e-x)$; calculating a reaction (Rij) component of the given content using an equation $Rij=f(w\ tT)$, where $f(x)=1/(1+e-x)$; and based on the spreadability and reaction components, making a determination whether to deliver the given content to other users of the social networking service or killing the given content, preventing its delivery to other users of the social networking service.

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
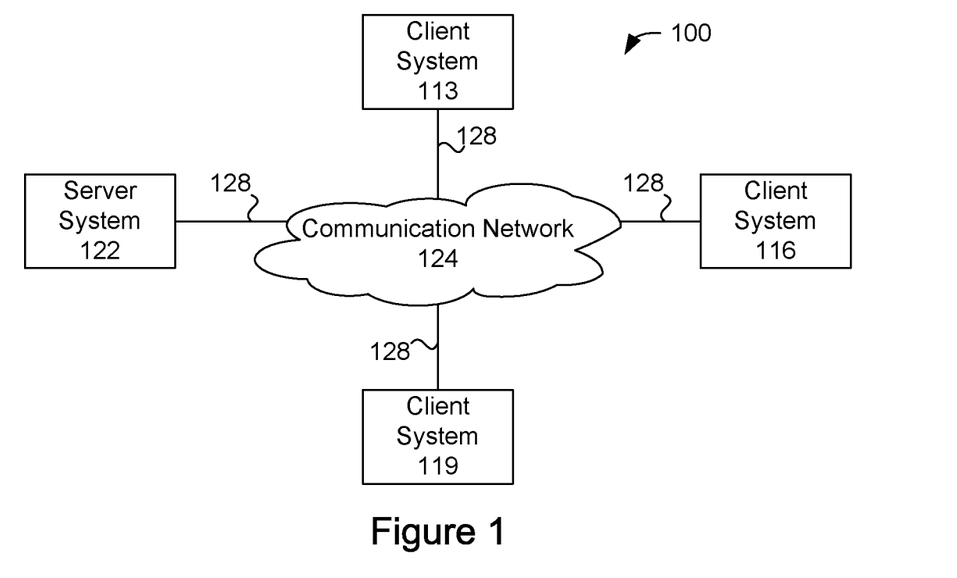
FIG. 1 shows a simplified block diagram of a client-server system implemented in a distributed computing network connecting a server and clients.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Communication links 128 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 1. These communication protocols may include VLAN, MPLS, TCP/IP, Tunneling, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, the client systems can run as a stand-alone application such as a desktop application or mobile smartphone or tablet application. In another embodiment, a "web browser" application executing on a client system enables users to select, access, retrieve, or query information stored by server system 122. Examples of web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 2:
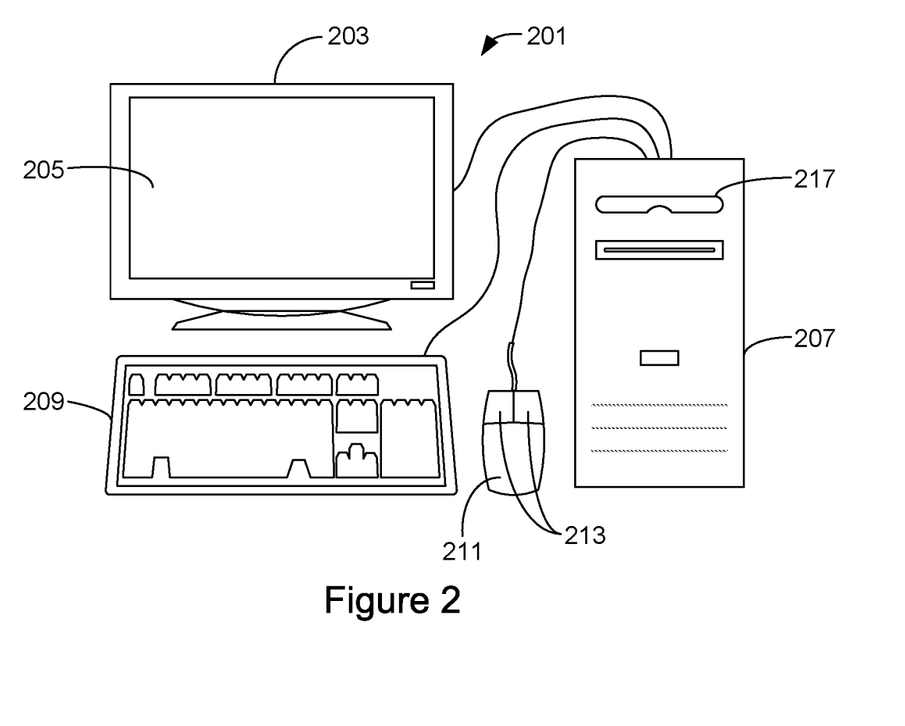
FIG. 2 shows a more detailed diagram of an exemplary client or computer which may be used in an implementation of the invention.

FIG. 2 shows an exemplary client or server system of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone 6), Apple iPad (e.g., Apple iPad or Apple iPad mini), Apple iPod (e.g, Apple iPod Touch), Samsung Galaxy product (e.g., Galaxy S series product or Galaxy Note series product), Google Nexus devices (e.g., Google Nexus 6, Google Nexus 7, or Google Nexus 9), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
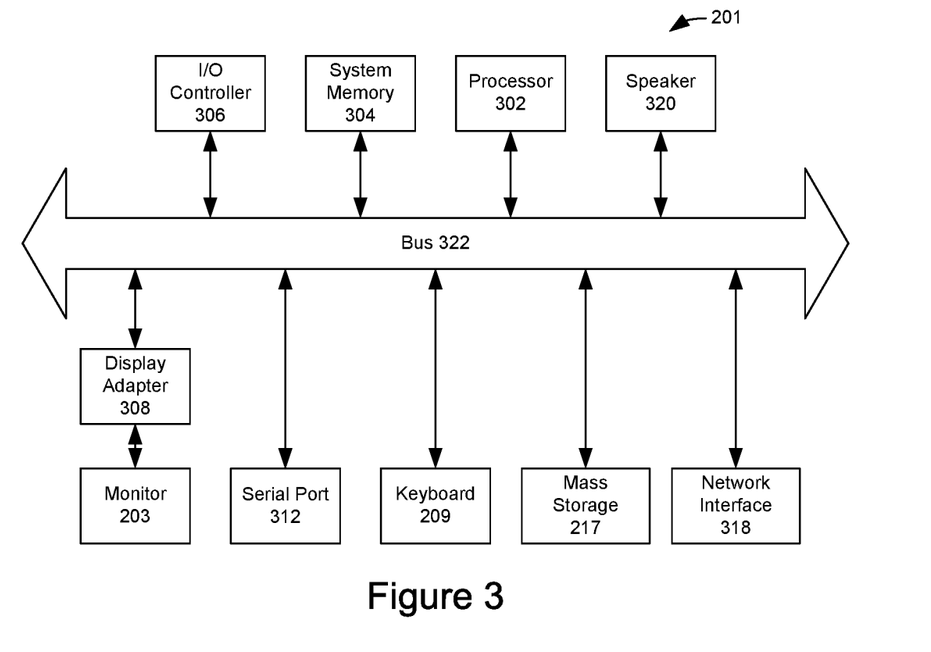
FIG. 3 shows a system block diagram of a client computer system used to execute application programs such as a web browser or tools.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C #, Pascal, Fortran, Perl, Matlab (from MathWorks, www.mathworks.com), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk.

We present a system and method that clusters like-minded users and allows them to generate, spread and share content in computing platforms, communicate among each other, make connections to expand their social networks, find networking partners based on professional interest, and facilitate either virtual, or video or in person meetings where, content is a piece of information such as text, image, video, audio, URL link. And computing platforms can be classified into two categories: mobile and stationary platforms.

Mobile computing platforms: are handheld computing devices, typically having a display screen with a touch input and/or keyboard. They have an operating system (OS) and can run various types of application software, also known as App. Most handheld devices can be equipped with WiFi, Bluetooth, GPS and RF capabilities that allow connections to cellular networks, the Internet or other devices for voice or data communication. Smartphones, PDAs, tablet computers, wearable computers such as smart watches, laptop computers, personal navigation devices and cameras are some of the popular examples.

Stationary computing platforms: include servers, mainframe and supercomputers and desktop computers. Typically, these platforms have great computing power, therefore, requiring significant electric power to operate. Therefore, their physical sizes and/or power requirements prevent them from being a mobile device. Servers operate within a client-server architecture. The server part is a system that responds to requests across a computer network to provide a service. The client is the component that generates the requests. The clients typically connect to the server through the network but may also run on the same computer. Another typical arrangement is peer-to-peer networking that enables all computers to act as either a server or client as needed.

2. The Content Spreading Engine (CSE)

Content spreading is especially useful for letting users discover new content, making connections with like-minded individuals and spreading their messages to users who are interested.

By using the CSE, the overall system achieves:

Identify like-minded users based on content, participation, commenting, favoriting, and other system functions, By expanding users social network with other like-minded users called Pals, user is exposed to new content coming from pals, enhancing the experience and allowing users to discover new content.

Introduce pals to each other to create a "global house party" environment and allow direct communication among each other. Allow Pals to form ephemeral chat rooms. Allow users to create exclusive private chat rooms.

It uses a "user accreditation" scheme such that: A new content coming from a new user is first delivered to a small group of people. Based on the reaction, the CSE delivers this message to a wider audience. As the new user keeps generating contents that receive acceptance in his/her colony, the size of the spreading gradually is made bigger. In case the content is a video, the allowed length of the video gets longer as the user establishes good standing. One benefit from the user accreditation scheme is to prevent users from injecting obscene or violence related content into this platform. Users are also allowed to select either a private distribution list from their address book or the more general automatic distribution (spreading) mechanism to broadcast their messages.

We combine these features on a set of products with a User Interface (UI) that has several functions such as Commenting by templates, Self-expression keyboards, and Starting a conversation by using templates, where "templates" are pre-composed text phrases and symbols. When users select to send "virtual" flowers, drinks, and others. to each other, the action is gamified (animated) by certain graphics. Some user groups are exclusive and only authorized users may be given membership to exchange messages. User biographies are displayed on their profile pages and there are templates to make data entry fun and easy. Certain buttons are offered for self-expression. Certain built-in buttons and themed badges are used to facilitate conversation among users (ice breakers). Certain mechanisms are used to reward and encourage users to generate content, start conversations, participate in existing conversations, prolong conversations (long lasting conversations), make contents popular, make as many friendships as possible (popular persona). Deliver all these functions is a real-life-like appearance such as Café scene socialization environment, Bar scene environment, House party socialization environment with Rooms that are dedicated for certain actions such as Main room for socializing with many people simultaneously, Backyard and pool party for socializing with groups of people, Fireplace chat for socializing with individuals, Bedroom chat for having conversations with romantic content, and Dance floor for entertaining with music. Not only these functions allow for socialization and communication but also networking meeting in person (physical) and virtually (remotely) through the App.

Content Spreading Mechanism

When a user requests content, following 4 combinations are to be handled:

old user-old content: the algorithm uses their history to match old user-new content: the algorithm uses user's history and who generated the content new user-old content: the algorithm uses content's popularity and distribution new user-new content: the new content should be first pushed to known users to get an initial reaction about spreadability.

(1) SPREADER (SP) is to initially push a given content, Ci (2) If PRUNER (PR) determines that the content doesn't have any spreading potential, it may decide to stop spreading Ci anytime.

(3) If the initial spread of Ci by SP goes well, RECOMMENDER (RE) takes over the task of spreading Ci.

(4) Decisions on spreading and killing a given content is based on number of times this content has been pushed (either by RE or SP), number of spread/kill responses to this content, age of the content, and/or number of fresh contents waiting to be pushed.

Note for a Specific Implementation (1) We only get response to a content if it has already been pushed to users by the system (not necessarily it's a popular content)

(2) If a content consistently is not making it to the top percentile of the recommendations queue, most likely it's not interesting for the selected user base.

(3) Due to worldwide timing and other similar factors, the ideal audience for Ci may not be online during the spread. This may lead to PR stopping the spread prematurely.

(4) While the user base is growing, the number of new users would be a significant portion of total users. Therefore, if Ci is originally stopped from delivery, it might still be interesting to some new users several days later.

(5) Prevents spams. For example, it detects if a dominating amount of content is coming from a user (spammer generated contents).

Spreadability (Si) of a given content Ci

Factors affecting spreadability Si includes, but not limited to:

S1: total number of spread/kill votes in a given time period (trend)

Remark 1: due to time zones or other similar factors, this time interval may not be too short.

Remark 2: This is dependent on how frequently our system has pushed Ci

S2: total number of commenting and then voting

S3: total number of just viewing comments and then voting

S4: total number of comments in Ci (popularity)

S5: average time each user viewed Ci

S6: total number of shares in other platforms (FB, TW, SMS, and others)

S7: total number of screen shots

S8: total number of reporting/flagging

S9: ratio of spreads/total votes: S/(S+K)

Spread: positive; Kill: negative;

$w=[w_1 \ w_2 \ \ldots \ w_N]$, $s=[s_1 \ s_2 \ \ldots \ s_N]$, $Si=f(w \ s^T)$, where $f(x)=1/(1+e^{-x})$ Reaction (Rij): Weighting user j's vote for content Ci Factors affecting reaction Rij includes but not limited to:

T1: spread/kill vote

T2: commenting and then voting

T3: just viewing comments and then voting

T4: time this user viewed Ci

T5: number of shares in other social networking platforms

T6: if a user saves a screen shot

T7: if user reports/flags a content

Spread: positive; Kill: negative;

$w=[w_1 \ w_2 \ \ldots \ w_N]$ $t=[T_1 \ T_2 \ \ldots \ T_N]$;

$Rij=f(w \ t^T)$, where $f(x)=1/(1+e^{-x})$

Content Bucket

The content bucket is to keep contents for delivery and orders them with respect to several factors, such as B1: user generated B2: system generated B3: freshness B4: spreadability B5: location and delivers them to users.

$w=[w_1 \ w_2 \ \ldots \ w_N]$, $b=[B_1 \ B_2 \ \ldots \ B_N]$, $Bi=f(w \ b^T)$, where $f(x)=1/(1+e^{-x})$ Pruning: when to stop spreading a content Ci Consider a time window, D, during which the number of observations have been made.

The activity level of a content Ci can be defined as $$T=a1(K/V)+a2(S/P)$$

where

S: total number of spreads for content Ci

K: total number of kills for content Ci

V: total votes for content Ci (S+K)

P: total pushes (spreads and kills) of all contents during D.

Note the first part indicates how much Ci is liked by users, the second part indicates how Ci competes with the rest of the contents in the bucket.

Spreading content Ci can be stopped if $T>\tau$, where $\tau$ is the threshold to stop delivering a content.

Content model has the following properties. These are related to each content (Ci)

1. Spread Count (S): Total number of users that pressed spread button for Ci

2. Kill Count (K): Total number of users that pressed kill button for Ci

3. Total Count (T): S+K

4. Freshness Factor (F): A real number between [0,1] that determines how fresh the content Ci is.

5. Spreading power (SP): A real number that captures the spreading power of content Ci. SP is a real number between [−1, 1]; values [0 1] indicating the content is spreading well, values [−1 0] indicating the content is dying.

$$SP=[(Ws \ S-Wk \ K)+(S-K)(Wc \ C+Wl \ L)]/[(Ws \ S+Wk \ K)+|S-K|(Wc \ C+Wl \ L)], \text{ if } T>0,$$

SP=1.0 otherwise.
where
Ws: weight for spread (say 10)
Wk: weight for kill (say 10)
Wc: weight for comment (say 5)
Wl: weight for comment likes (say 1)
Comment Count (CC): Total number of comments for Ci
Total Like Count (L): Sum of all likes for comments for content Ci.

Note that this approach does not include a time factor. Also, it does not give any weight to total spread. In other words, SE is scale invariant: S, K, and CC can be scaled by the same factor without changing SE.

User Response Model

User Response model properties are related to each user (Uj) for content Ci.

1. Authorship (Aij): It is 1 if the user Uj is the author of the content Ci or 0 otherwise.

2. Number of comments (C): Total number of comments user Uj has made for content Ci.

3. Number of likes (L): Total number of likes user Uj has made for all comments elated to content Ci.

4. User Response for content: User Uj can response for content Ci in two ways: Spread or Kill. The response Rij=1 for spread; Rij=−1 for kill.

5. User Preference Index (Pij): This is the combined value of the user Uj's preference for content Ci. This index is defined as $$Pij=Wau+(Ws\ S)+(Wc\ C)+(Wl\ L), \text{ if } Aij=1;$$

$$=Ws+(Wc\ C)+(Wl\ L), \text{ if } Aij=0 \text{ and } Rij=1$$

$$=Wk-(Wc\ C)-(Wl\ L), \text{ if } Aij=0 \text{ and } Rij=-1$$

where
Wau: weight for authorship (for example, 50)
Ws: weight for spread (for example, 10)
Wk: weight for kill (for example, 10)
Wc: weight for comment (for example, 5)
Wl: weight for comment likes (for example, 1)

It is likely that user may write a comment but might kill the content.

User's own comments (Co) are to be separated from total number of comments (C).

Comment Model

It has the following properties. These are related to each comment (Coi)

Like Count (LC): Total number of likes for comment Coi.
Popularity: how many other comments it has triggered.

Content Selection with a Recommendation Engine

A unique facet of the CSE is its method of selecting contents to spread to users. The CSE has a dynamic feedback system to continually improve the quality of its recommended contents. This process takes place in three stages:

1. The user-based recommendation stage. Given a user U placed in a colony C by the MSE, the expressed preferences for new contents of other users in C, are used to determine a recommendation ranking for each new content. The top-ranked contents are then spread to U.

2. The trending content spreading stage. The CSE identifies "trending content," temporally-relevant messages that are rapidly rising in popularity. These trending messages are classified based on several features. Spread rate (change in number of spreads per time interval), kill rate (change in number of kills per time interval), Comment rate (number of comments from unique users per time interval). These time-varying signals are processed to remove random fluctuations, and then analyzed for patterns predictive of quickly spreading, temporally-relevant information. Finally, when trending contents are identified, a few of the most popular ones are spread to users with reduced emphasis on the user-based recommendation metric.

3. The feedback stage. In this stage, an assessment is made of the user's satisfaction with contents received from the CSE. The user's explicit responses to each content are recorded and integrated into the CSE's model of user preferences. With every feedback analysis, changes in user tastes are noted and categorization of users are reconsidered.

The MSE is comprised of several recommendation components. One of these units is the user-based recommender, while another is the content-based recommender. The content-based recommender classifies content using message meta-data, user-generated tags, and message keywords identified through natural language processing techniques. For every message in the system, an array of features is extracted, including text keywords, message tags applied by the user, and comment keywords. Furthermore, the text of every user's search history, self-disclosed information in user profiles, and propagated messages are stored and analyzed to extract a corpus of keywords representing the user's interests. These keywords are further refined through a comparison with the keywords extracted from each content the user has expressed interest in. With this data the content-based recommender can provide another metric for determining the likelihood that a given user will be interested in a given message. The MSE uses the user-based recommender in conjunction with this content-based recommender. Upon every interaction with a content, the corpus of keywords associated with a user is reassessed.

Collaborative Filtering for Content Selection

The recommendation engine uses collaborative filtering to make both user-based and content-based recommendations. One implementation example is that it may be built on Apache Mahout, be implemented on Java, use Json-based full duplex APIs, and/or use an EC2 instance on Amazon Web Services.

User Connection:

The MSE maintains two data models representing user relationships: i) a matrix of user's preferences for all contents, and ii) a history of each user's implicit and explicit indications of affinity for other users.

These indicators of affinity are weighted with empirically-derived coefficients to reflect statistical likelihood of true interest in a particular user. Given these data models, the MSE can compute a user similarity metric which denotes the likelihood of affinity between any given pair of users.

Using this measure, the MSE can recommend candidates for introduction, once a sufficient level of confidence is achieved. In particular, this enables the establishment of a private communication channel between users with mutually-shared interests. This communication channel, can be ephemeral, expiring after a short period of time (e.g. 24 hours). Furthermore, in order to overcome the inertia of initial social contact, this communication channel is equipped with a custom keyboard comprised of predetermined text and images, sorted by emotional state, that allow users to communicate creatively without the labor of composing a message from a blank slate. In the same vein of this effort, these private messaging channels begin with a reference to some shared history between the two users, of which they were heretofore unaware; for example, contents or users for which they both expressed high interest.

User Similarity:

Given their rating vectors $R_u$ and $R_v$, similarity between two users u and v, sim(u,v), can be calculated in many ways. Some of the well-known approaches are Pearson correlation, Spearman correlation, cosine similarity and adjusted cosine similarity.

For example, the cosine similarity between users u and v, sim(u, v) is computed as the cosine of their respective rating vectors, $R_u$ and $R_R$, $$sim(u,v)=cosine(R_u,R_v)=(R_u*R_v)/(|R_u|\cdot 51\ R_v|)$$

where * is the dot product and · is the regular multiplication.

Forming Clusters

By using a measure for user similarity, such as the cosine similarity as described above, users and items with similar nature can be grouped to form clusters.

Professional Networking

As much information as possible is collected from users to identify their professions and their networking needs. Users are asked to respond to questionnaires or interviews for profiling, and also their interactions both with the app and with other users are monitored by the machine learning methods outlined above to automatically determine their preferences and needs.

One way to achieve this is to form clusters among like-minded users and share contents among each other. If a member of a cluster likes an item such as text, picture and video, we spread it to all other members of the same cluster. With similar mechanisms, the like-minded members of the same cluster as well as complementary clusters are introduced to each other, to help users expand their social network. In other words, we offer matching based on social interactions. To characterize each cluster, we ask well-known personality differentiation questions to each member.

In one embodiment, we simulate "lunch-going-experience" and offer users an environment to interact with other users within this theme. Users can communicate with others as if they are attending a business lunch.

In another embodiment, we simulate "cafe-going-experience" and offer users an environment to interact with other users within this theme. Users can communicate with others as if they are attending a business meeting in a coffee shop.

Users can meet with other users that the recommendation algorithm finds a match. The match can be based on preferences, professions, needs, and others.

Use cases include professionals willing to expand their network and/or provider-client meetings. It can either be used to arrange a meeting in person or a virtual meeting simulated by the app. An invitation is sent to all users who might be a good match. The ones who accept are guided to meet.

GPS-based positioning is used. Users are asked to input their preferences for maximum meeting distance if they're meeting in person. The app offers places to meet. The location of users who allow GPS location sharing, are matched with the users in a given neighborhood.

Interest Groups/Circles: Users can create their own circles to accommodate special purpose communications. Circles can either be private or public. A private circle cannot be discovered by a search. Conversations in each circle can be monitored or moderated by its owners. Members in each circle could be certain interest groups such as Musicians, Accountants, Investors, Students, Private meetings, Religious groups, Alumni clubs, Neighborhoods. By setting the circle filter, users can either socialize or meet with these circle members.

User Matching

The key to a satisfying match is a combination of profession and skill match complemented by quality of service.

satisfying match=skills match+service quality

We accomplish this by assigning a matching score for a given pair of individuals based on these two parameters as following:

$$S_m=\alpha S_s+\beta S_f$$

where $0<\alpha<1$ and $0<\beta<1$ are emphasis coefficients, $S_s$ is the skills match score and $S_f$ is the service quality score.

The user match score, $S_s$, can be calculated in many ways. One example is to use the user similarity measure as described earlier:

$S_s=sim(u,v)$ where u and v are users. Let $R_u$ and $R_v$ be users u and v's reaction to contents and other app features, respectively. Then the similarity can be calculated as $$sim(u,v)=cosine(R_u,R_v)=(R_u*R_v)/(|R_u|\cdot|R_v|)$$

and then clusters containing like-minded users are formed. Users can be matched in two ways after forming these clusters. Assume certain clusters are already formed based on user reactions to standard contents that are generated by users, or specifically designed probing contents to identify user types (dichotomies), and their opinions, and by determining user's profession.

The service quality score, $S_f$, is determined based on the feedback a user gets after performing a service. In one embodiment, this can be based on an interview of parties after they met either on-line or in person and asking them to rate each other in several aspects.

Method 1: Match Similar Professions and Skills

In this approach, users within a particular cluster are introduced to each other. For example, users who want to improve their professional strength can meet and communicate. These groups, for example, can be musicians, artists, teachers, entertainers, Engineers, photographers and lawyers.

Method 2: Match Users with Complementary Professions and Skills

In this approach service providers and receivers are introduced to each other. In one embodiment, these pairs would be service providers and prospective clients, for example, financial advisors and prospective clients, athletes and coaches, real estate agents and prospective clients, animal trainers and prospective clients, tutors and students, job searchers and employers, college admission officers and prospective students, entrepreneurs and investors.

It's important to note that these personality types are not always hard and that there exists a spectrum even within clusters. There are certain types that seem to naturally work better together. Once the match has been made, users can either meet in person or can have video meetings.

The Point System for Networking

In order for users to access certain privileges in the app, they are asked to spend points.

Earning Points:

Points (rewards) are earned in the app with the purpose of promoting good content quality, encouraging voting (like/dislike) to get feedback for our recommender, and increasing the number users.

We use the following equation to calculate the points for each user:

$$\text{Points earned} = \sum_{i=1}^{N} w_i a_i$$

where N is the number of parameters, $a_i$ is type of user interaction, and $w_i$ is the weight of each component.

For example, one implementation is $$\text{Points earned} = w_1 a_1 + w_2 a_2 + \ldots + w_8 a_8$$

where,
a1: number of votes on contents (liking or disliking)
a2: number of likes for contents that created by this user
a3: number of likes for comments that written by this user
a4: number of flags raised for bad contents
a5: number of new user invitations to the app
a6: number of followers
a7: number of friends
a8: number of contents shared or forwarded to users in other platforms
And the weights can be selected such that
w1=1
w2=4
w3=2
w4=5
w5=10
w6=1
w7=2
w8=8
spending points
Similarly, points spent are the sum of certain activities:

$$\text{Point spent} = \sum_{i=1}^{N} w_i s_i$$

$s_1$: number of connection invitations that are sent to other users
$s_2$: number of boosts to emphasize message spreading to large audience
$s_3$: number of boosts to emphasize networking matches
where
$w_1 = 25$
$w_2 = 5$
$w_3 = 10$ The points can either be earned by promoting and contributing to the app or can be purchased. Users can pay monthly fees to buy points. Points can also be purchased with bitcoins.

Another method to enjoy the app privileges is to get a daily pass with an admission fee that covers a short time duration, such as 24 hours.

User matches can be based on location, i.e., users can specify the physical distance or neighborhood and the user matches are made for the ones who meet the criteria.

Once the match has been made, if users decide to meet in person the app sends calendar invites to them.

If a provider wants to charge a client, the app can accommodate money transfer between their accounts.

If users want to meet in person after a match, the app offers locations and offers coupons or discounts in meeting places such as restaurants, coffee shops, and others.

After getting permission from users, their professional backgrounds from popular platforms, such as the one from Linkedin Corporation, can be compared against each other to improve the quality of the match.

Potential matches can be displayed on a list or map view with the actual geographic references and distances.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
providing a social networking service comprising a content spreading engine;
for the content spreading engine, using an electronic processor, calculating a spreadability (Si) component of a given content using an equation $Si=f(w\ s^T)$, where $f(x)=1/(1+e^{-x})$, wherein w comprises a vector of weights, s comprises a vector of factors affecting spreadability Si, and T represents a transpose operation;
calculating a reaction (Rij) component of the given content using an equation $Rij=f(w\ t^T)$, where $f(x)=1/(1+e^{-x})$, wherein t comprises a vector of factors affecting reaction Rij; and
based on the spreadability and reaction components, making a determination whether to deliver the given content to other users of the social networking service or killing the given content, preventing its delivery to other users of the social networking service.

2. The method of claim 1 wherein s comprises a factor comprising a total number of spread or kill votes in a given time period.

3. The method of claim 1 wherein s comprises a factor comprising a total number of commenting and then voting.

4. The method of claim 1 wherein s comprises a factor comprising a total number of just viewing comments and then voting.

5. The method of claim 1 wherein s comprises a factor comprising a total number of comments in a given content Ci.

6. The method of claim 1 wherein s comprises a factor comprising an average time each user viewed a given content Ci.

7. The method of claim 1 wherein s comprises a factor comprising a total number of shares in other social networking platforms.

8. The method of claim 1 wherein s comprises a factor comprising a total number of screen shots.

9. The method of claim 1 wherein s comprises a factor comprising a total number of reporting or flagging.

10. The method of claim 1 wherein s comprises a factor comprising a ratio of spreads to total votes.

11. The method of claim 1 wherein t comprises a factor comprising a spread or kill vote.

12. The method of claim 1 wherein t comprises a factor comprising a commenting and then voting.

13. The method of claim 1 wherein t comprises a factor comprising a just viewing comments and then voting.

14. The method of claim 1 wherein t comprises a factor comprising a time a user viewed a given content Ci.

15. The method of claim 1 wherein t comprises a factor comprising a number of shares in other social networking platforms.

16. The method of claim 1 wherein t comprises a factor comprising a user saving a screen shot.

17. The method of claim 1 wherein t comprises a factor comprising a user reporting or flagging a content.

18. The method or claim 1 wherein s comprises at least one of a factor comprising
- a total number of spread votes in a given time period,
- a total number of kill votes in a given time period,
- a total number of commenting and then voting,
- a total number of just viewing comments and then voting,
- a total number of comments in a given content Ci,
- an average time each user viewed a given content Ci,
- a total number of shares in other social networking platforms,
- a total number of screen shots,
- a total number of reporting or flagging, or
- a ratio of spreads to total votes.

19. The method or claim 1 wherein t comprises at least one of a factor comprising
- a spread vote,
- a kill vote,
- a commenting and then voting,
- a just viewing comments and then voting,
- a time a user viewed a given content Ci,
- a number of shares in other social networking platforms,
- a user saving a screen shot,
- a user reporting content, or
- a user flagging a content.

20. The method or claim 1 wherein s comprises at least one of a factor comprising
- a total number of spread votes in a given time period,
- a total number of kill votes in a given time period,
- a total number of commenting and then voting,
- a total number of just viewing comments and then voting,
- a total number of comments in a given content Ci,
- an average time each user viewed a given content Ci,
- a total number of shares in other social networking platforms,
- a total number of screen shots,
- a total number of reporting or flagging, or
- a ratio of spreads to total votes, and t comprises at least one of a factor comprising
- a spread vote,
- a kill vote,
- a commenting and then voting,
- a just viewing comments and then voting,
- a time a user viewed a given content Ci,
- a number of shares in other social networking platforms,
- a user saving a screen shot,
- a user reporting content, or
- a user flagging a content.

* * * * *